United States Patent
Stauffer

(12) 
(10) Patent No.: US 11,262,569 B2
(45) Date of Patent: Mar. 1, 2022

(54) HIGH CONTENT IMAGING SYSTEM AND A METHOD OF OPERATING THE HIGH CONTENT IMAGING SYSTEM

(71) Applicant: Molecular Devices, LLC, Sunnyvale, CA (US)

(72) Inventor: Loren A Stauffer, Narvon, PA (US)

(73) Assignee: Molecular Devices, LLC, San Jose, CA (US)

( * ) Notice: Subject to any disclaimer, the term of this patent is extended or adjusted under 35 U.S.C. 154(b) by 0 days.

(21) Appl. No.: 16/805,168

(22) Filed: Feb. 28, 2020

(65) Prior Publication Data

US 2020/0201017 A1 Jun. 25, 2020

Related U.S. Application Data

(63) Continuation of application No. 15/547,003, filed as application No. PCT/US2016/015297 on Jan. 28, 2016, now Pat. No. 10,606,060.

(Continued)

(51) Int. Cl.
*G02B 21/36* (2006.01)
*G02B 21/24* (2006.01)
(Continued)

(52) U.S. Cl.
CPC ......... *G02B 21/365* (2013.01); *G02B 21/245* (2013.01); *G02B 21/361* (2013.01);
(Continued)

(58) Field of Classification Search
CPC .. G02B 21/365; G02B 21/361; G02B 21/245; G02B 21/248; G02B 21/0076;
(Continued)

(56) References Cited

U.S. PATENT DOCUMENTS 5,703,714 A 12/1997 Kojima
7,649,682 B2 * 1/2010 Olschewski .......... G06T 7/0002
359/368

(Continued)

FOREIGN PATENT DOCUMENTS

CN 203324566 12/2013
EP 2081072 A1 7/2009
(Continued)

OTHER PUBLICATIONS

Final Rejection by Japan Patent Office (JPO) in reference to related application 2017-540178, dated Aug. 25, 2020 (3 pages).

(Continued)

*Primary Examiner* — Howard D Brown, Jr.
(74) *Attorney, Agent, or Firm* — Merchant & Gould P.C.

(57) ABSTRACT

A high content imaging system and a method of operating the high content imaging system are disclosed. A microscope has a first objective lens and a second objective lens, and an objective lens database has first and second transformation values associated with the first and the second objective lenses, respectively. A microscope controller operates the microscope with the first objective lens to develop first values of acquisition parameters. A configuration module automatically determines second values of the acquisition parameters using the first values of the acquisition parameters, first transformation values associated with the first objective lens, and second transformation values associated with the second objective lens. The microscope controller operates the microscope using the second objective lens and the second values of the acquisition parameters.

19 Claims, 3 Drawing Sheets

Related U.S. Application Data

(60) Provisional application No. 62/109,708, filed on Jan. 30, 2015.

(51) Int. Cl.
*H04N 5/232* (2006.01)
*G02B 21/00* (2006.01)
*G02B 21/12* (2006.01)
*G02B 21/16* (2006.01)

(52) U.S. Cl.
CPC ..... *H04N 5/23222* (2013.01); *H04N 5/23245* (2013.01); *G02B 21/0076* (2013.01); *G02B 21/12* (2013.01); *G02B 21/16* (2013.01); *G02B 21/248* (2013.01)

(58) Field of Classification Search
CPC .... G02B 21/12; G02B 21/16; H04N 5/23222; H04N 5/23245
See application file for complete search history.

(56) References Cited

U.S. PATENT DOCUMENTS

| | | | |
|---|---|---|---|
| 2003/0016301 A1 | 1/2003 | Aizaki et al. | |
| 2003/0142398 A1* | 7/2003 | Leblans | G02B 21/244 359/383 |
| 2005/0105174 A1 | 5/2005 | Ogihara et al. | |
| 2009/0168156 A1* | 7/2009 | Ariga | G02B 21/365 359/381 |
| 2009/0185034 A1* | 7/2009 | Kishida | G02B 21/365 348/79 |
| 2018/0003941 A1* | 1/2018 | Stauffer | H04N 5/23222 |
| 2021/0295953 A1* | 9/2021 | Kitahashi | G06F 16/51 |

FOREIGN PATENT DOCUMENTS

| | | | |
|---|---|---|---|
| JP | 05165079 | | 6/1993 |
| JP | 05165079 A * | | 6/1993 |
| JP | H0643355 A | | 2/1994 |
| JP | H0821956 A | | 1/1996 |
| JP | 08160312 A | | 6/1996 |
| JP | 08211295 A | | 8/1996 |
| JP | 3458002 B2 | | 10/2003 |
| JP | 2009169236 A | | 7/2009 |
| JP | 2010122623 A | | 6/2010 |
| JP | 2013-190680 A | | 9/2013 |

OTHER PUBLICATIONS

Translation of the above-noted Final Rejection by Japan Patent Office (JPO) in reference to related application JP 2017-540178, dated Aug. 25, 2020 (4 pages).
Office Action by China National Intellectual Property Administration (CPO) in reference to related application CN 2016800201402, dated Sep. 29, 2020 (6 pages) with accompanying Statement of Relevance.
Chinese-language office action issued in counterpart CN Application No. 201680020140.2 dated Jul. 3, 2019 with English summary translation.
"Micro-Manager / Re: [micro-manager-general] Change optovar value," Jun. 20, 2011 (Jun. 20, 2011), XP055509427, Retrieved from the Internet: https://sourceforge.net/p/micro-manager/mailman/message/27680377/[made of record in parent U.S. Appl. No. 15/547,003, filed Jan. 17, 2019].
"Operating Manual Axio Observer," Dec. 1, 2006 (Dec. 1, 2006), pp. 97-97, XP055509749, Retrieved from the internet: http//www.torontomicrofluidics.ca/cms/manuals/AxioObserverManual.pdf [made of record in parent U.S. Appl. No. 15/547,003, filed Jan. 17, 2019].
European Communication pursuant to Rules 70(2) and 70a(2) EPC issued in counterpart EP application No. 16744082.5 dated Nov. 5, 2018 (one page).
Extended European Search Report issued in counterpart EP application No. 16744082.5 dated Oct. 17, 2018 (thirteen pages).
Japanese-language office action issued in counterpart JP application No. 2017-540178 dated Nov. 26, 2019, with English Summary Translation.
International Search Report and Written Opinion dated May 16, 2016 from International Application No. PCT/US2016/015297.
European Summons to Attend Oral Proceedings in European Application 16744082.5, dated Jun. 1, 2021, 14 pages.
Anonymous: "Protocol for Microscope Calibration", Jun. 8, 2012, (Jan. 8, 2012), XP055600043, Retrieved from the Internet: URL:http://www3.unifr.ch/bioimage/wp-content/uploads/2013/09/CalibrationProtocol.pdf [retrieved on Jun. 27, 2019], 15 pages.
Anonymous: "Instructions Automated Image Acquisition Software", Jan. 19, 2009 (Jan. 19, 2009), XP055600042, Retrieved from the Internet: URL:https://www.zmbh.uni-heidelberg.de/Central_Services/Imaging_Facility/info/ScanR_Acqu.pdf [retrieved on Jun. 27, 2019], 80 pages.
Anonymous: "NIS-Elements Documentation User's Guide (Ver. 4.00)", Sep. 12, 2011 (Sep. 12, 2011), XP055804087, Retrieved from the Internet: URL:http://www.mvi-inc.com/wpcontent/uploads/NIS_4.00_D_User_Gulde.pdf [retrieved on May 12, 2021], 23 pages.
Svedberg Brian: "The "How Do . . . " Guide to AxioVision", Mar. 20, 2002 (Mar. 20, 2002), XP055805369, Retrieved from the Internet: URL:https://isu.technion.ac.il/wp-content/uploads/2016/11/How_Do_I_guide.pdf [retrieved on May 18, 2021], 21 pages.
Edelstein Arthur D et al: "Advanced methods of microscope control using [mu] Manager software", Journal of Biological Methods, vol. 1, No. 2, Nov. 7, 2014 (Nov. 7, 2014), p. e10, XP055805375, DOI: 10.1440/jbrn.2014.36 Retrieved from the Internet: URL:https://jbmethods.org/jbm/article/down load/36/29, 10 pages.
European Result of Consultation in Application 16744082.5, mailed Nov. 22, 2021, 6 pages.
European Decision to Refuse in Application 16744082.5, dated Dec. 8, 2021, 4 pages.

* cited by examiner

HIGH CONTENT IMAGING SYSTEM AND A METHOD OF OPERATING THE HIGH CONTENT IMAGING SYSTEM

RELATED APPLICATIONS

This application is related to and claims priority to U.S. Ser. No. 15/547,003, filed Jan. 27, 2017, entitled "A High Content Imaging System and a Method of Operating the High Content Imaging System," which is national stage of PCT/US2016/015297, filed Jan. 28, 2016, which claims priority to U.S. provisional application no. 62/109,708 filed on Jan. 30, 2015, entitled "A High Content Imaging System and a Method of Operating the High Content Imaging System," the entire contents of each application noted above are incorporated herein by reference.

FIELD OF DISCLOSURE

The present subject matter relates to configuration of a high content imaging system, and more particularly, to configuration of acquisition settings for a high content imaging system.

BACKGROUND

A high content imaging system (HCIS) may be used for semi-automatically or automatically capture images of a microscopy sample. A typical HCIS includes a microscope having objective lenses of different magnifications, one or more illumination sources and an image capture device such as a charge-coupled device or a complementary metal-oxide-semiconductor (CMOS) chip to produce images of the microscopy samples. The illumination source may include a laser or other light source that scans the microscopy sample with focused light, and light reflected from microscopy sample and/or transmitted through the microscopy sample is imaged by the image capture device. In some cases, the illumination source may cause the microscopy sample to fluoresce and light emitted by such fluorescence may be captured by the image capture device.

In addition, the microscopy samples may reside at various measurement locations (e.g., wells) of a sample holder. Once the HCIS is configured with acquisition parameter values for a selected objective lens and illumination source, the HCIS may automatically image a plurality of microscopy samples using the selected objective lens and illumination source. Such acquisition parameter values may include an exposure time per wavelength of light to produce an image of a particular intensity, a distance between the focal plane of the objective and the illumination source focus position, and laser autofocus exposure time.

Typically, each time a different objective lens is selected for use with the microscopy sample, the acquisition parameter values used for imaging may need to be adjusted based on the new objective lens. Such adjustment of acquisition parameter values may have to be specified by the user using one or more sample images captured by the HCIS, and thus reduce the efficiency of the HCIS.

SUMMARY

According to one aspect, a high content imaging system includes a microscope having a first objective lens and a second objective lens, an objective lens database, a microscope controller, and a configuration module. The objective lens database has first and second transformation values associated with the first and the second objective lenses, respectively. The microscope controller operates the microscope with the first objective lens to develop first values of acquisition parameters. The configuration module automatically determines second values of the acquisition parameters using the first values of the acquisition parameters, first transformation values associated with the first objective lens, and second transformation values associated with the second objective lens. Thereafter, the microscope controller operates the microscope using the second objective lens and the second values of the acquisition parameters.

According to another aspect, a method of operating a high content imaging system that includes a microscope, a first objective lens, a second objective lens, and an image capture device, includes the step of operating the microscope with the first objective lens to develop first values of acquisition parameters. The method also includes the step of automatically determining second values of the acquisition parameters using the first values of the acquisition parameters, first transformation values associated with the first objective lens, and second transformation values associated with the second objective lens. In addition, the method includes the step of operating the microscope using the second objective lens and the second values of the acquisition parameters.

DETAILED DESCRIPTION

Figure 1:
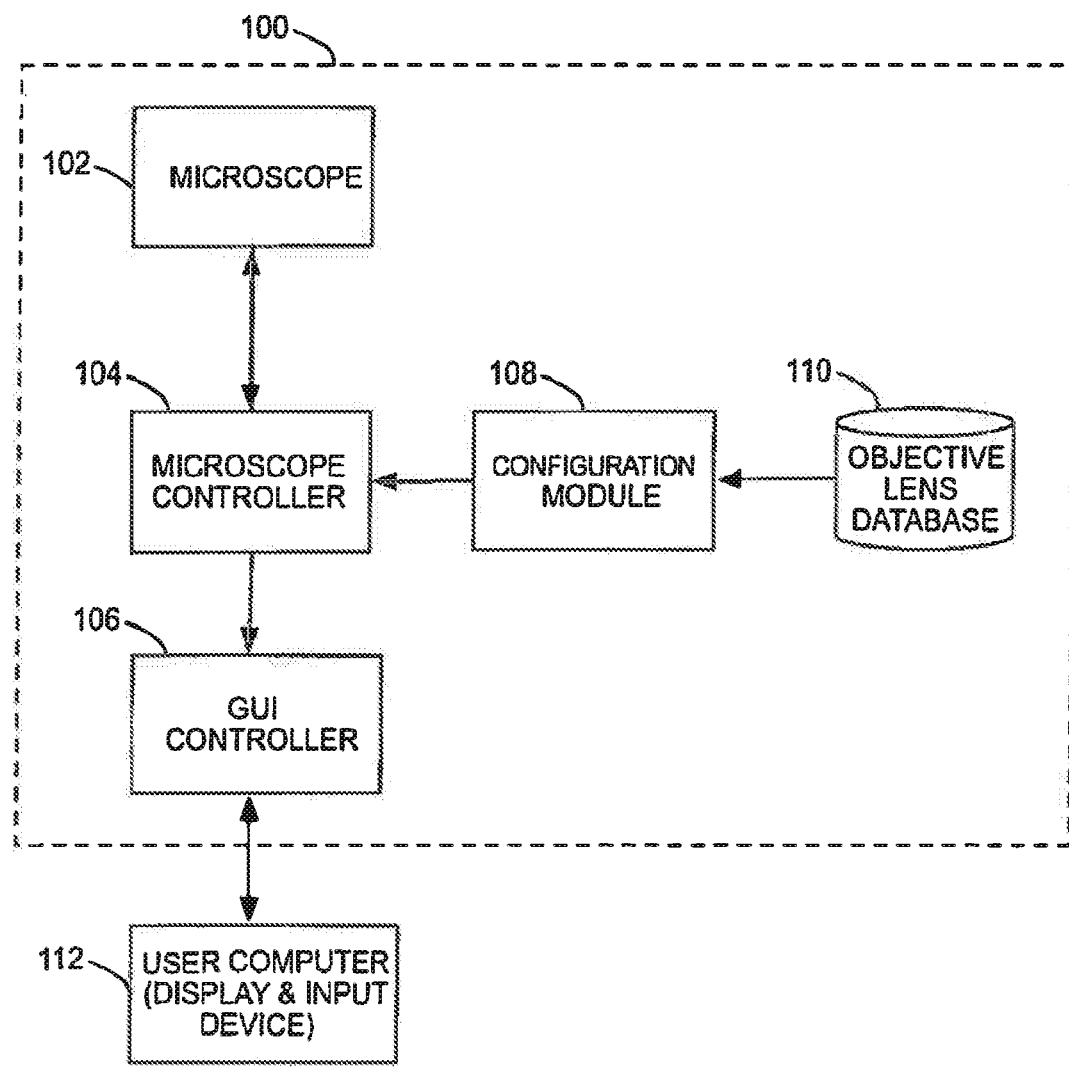
FIG. 1 is a block diagram of a high content imaging system.

Referring to FIG. 1, an HCIS 100 includes a microscope 102, a microscope controller 104, a graphical user interface (GUI) controller 106, a configuration module 108, and an objective lens database 110. The microscope 102 may include one or more objective lenses, one or more illumination sources, a focusing laser, focusing mechanics, one or more filters, and an image capture device. Such components are typically installed in the microscope 102 before the microscope 102 is delivered to a user. In some cases, such components may be modified after delivery of the microscope 102, for example, as part of an upgrade or for a special application. U.S. patent application Ser. No. 14/238,121, published as U.S. Patent Appl. Pub. No. 2014/0210981A1, describes an example HCIS. The entire contents of this application are incorporated herein by reference.

The microscope controller 104 may provide digital commands or electronic signals to configure the microscope 102 for a particular application. Such configuration may include selection of an objective lens, an illumination source, and/or specification of values of one or more acquisition parameters described above.

In some embodiments, the GUI controller 106 may be coupled with a screen of, for example, a computer 112 operated by the user. The GUI controller 106 may display on the screen computer 112 the values of acquisition parameters with which the microscope 102 is currently configured. In addition, the GUI controller 106 may allow the user to use an input device associated with the computer 112 to modify values of such acquisition parameters.

During operation of the HCIS 100, the user loads a microscopy sample into the HCIS 100, and uses the input device of the computer 112 to specify an objective lens, an illumination source, and the like to use for imaging with the microscope 100.

The GUI controller 106 provides such acquisition parameters to the microscope controller 104, which configures the microscope 102 accordingly. Thereafter, the microscope controller 104 directs the microscope to load the selected objective lens into the light path between the microscopy sample and the image capture device and directs the image capture device of the microscope 100 to capture an evaluation image of at least a portion of the microscopy sample. The microscope controller 104 receives from the image capture device the evaluation image, and provides such image to the GUI controller 106 for display on the screen associated with the computer 112.

The evaluation image may be imaged at a lower resolution than the HCIS 100 can produce and/or may be an image of only a portion of the microscopy sample.

The user may evaluate the evaluation image, and if the intensity, focus, and other aspects of the evaluation image are as expected by the user, uses the input device of the computer 112 to direct the HCIS 100 to image the entire microscopy sample. The GUI controller 106, the microscope controller 104, and the microscope 102 operate as described above to generate a final image of the microscopy sample that is at full resolution and/or includes the entire sample. Such final image may be displayed on the screen of the computer 112, recorded on a storage medium (not shown) associated with the HCIS 100, recorded on a storage medium (not shown) associated with the computer 112, and/or transmitted to another system (not shown) for further processing.

However, if the user is not satisfied with the quality of the evaluation image, the user may modify the values of one or more acquisition parameters using the input device of the computer 112, and direct the HCIS 100 to capture a further evaluation image. The user may iterate in this manner until an evaluation image is captured that satisfies the expectations of the user, after which the user may direct the HCIS 100 to capture a final image of the microscopy sample as described above.

As one who has ordinary skill in the art would appreciate, adjustments of values of acquisition parameters such as focal distance, exposure time, and the like may be easier to make using a low magnification objective lens. Therefore, the user may direct the HCIS 100 to use a low magnification objective lens to capture and assess the evaluation images, and then direct the HCIS 100 to capture the final image using an objective lens that has higher magnification. Similarly, the user may direct the HCIS 100 to configure values of the acquisition parameters of the HCIS 100 using the low magnification objective as described above, then direct the HCIS 100 to capture one or more final images using the low magnification objective lens and capture additional images using one or more other objective lenses.

In those cases in which the user uses a first objective lens to capture one or more evaluation images of a microscopy sample and/or to configure parameters of the microscope 100, and then directs the HCIS 100 to use a second objective lens to capture a further image the microscopy sample, the configuration module 108 may automatically derive from the values of the acquisition parameters used with the first objective lens, the values of the acquisition parameters to use with the second objective lens. Such automatic derivation of values of the acquisition parameters may save the user time and effort of evaluating images captured by the HCIS 100 using the second objective lens, and/or manually determining the parameters to use with the second objective lens.

The configuration module 108 uses information stored in the objective lens database 110 to automatically determine the values of the acquisition parameters to use with second objective lens from the values of the acquisition parameters used with the first objective lens. In particular, the objective lens database 110 includes the specifications for the objective lenses installed in the microscope 102. In one embodiment, for each acquisition parameter, the objective lens database 110 includes a transformation value that specifies a relationship between a value of such parameter with respect to a first objective lens and values of such acquisition parameter with other objective lenses. For example, the objective lens database 110 may specify for the acquisition parameter Exposure Time at 550 nm Wavelength, a transformation value of 100% for a 10X Plan Fluor objective lens, a transformation value of 140% for a 20X S Fluor objective lens, and a transformation value of 180% for a 40X Plan Apo objective lens.

In the example above, if the first objective lens is the 10X Plan Fluor lens, the second objective lens is the 40X Plan Apo lens, and the user determined using the 10X Plan Fluor that an exposure of 1 second is an appropriate exposure, the configuration module 108 uses the transformation values associated with such lenses and stored in the objective lens database 110 to determine that the microscope should be configured to use an exposure of 1.8 seconds (i.e., 1 second times 180%/100%) with the 40X Plan Apo lens.

The table below shows examples of acquisition parameters for which a transformation value may be stored in the objective lens database 110, and a unit of such transformation value. The table also shows how the configuration module 108 may transform a first value of a particular acquisition parameter that is used with a first objective O1 into a second value of the acquisition parameter for use with a second objective lens O2. Such transformation is determined using the first and second transformation values TV(O1) and TV(O2) associated with the first and second objective lenses, respectively, and associated with the acquisition parameter. It should be apparent to one of ordinary skill in the art that transformation values may be stored in the objective lens database 110 in an entry associated with each objective lens in the microscope 100.

| Acquisition Parameter | Unit of Transformation Value (TV) | Transform |
|---|---|---|
| Exposure time (ET) | Percent | ET(O2) = ET(O1) * TV(O2)/TV(O1) |
| Focal Plane Offset (F) | Microns | F(O2) = F(O1) + TV(O2) − P(O1) |
| Laser Autofocus Exposure Time (LT) | Percent | LT(O2) = LT(O1) * TV(O2)/TV(O1) |
| Pixel Size in X-direction (PSX) | Microns | PSX(O2) = PSX(O1) + TV(O2) − TV(O1) |
| Pixel Size in Y-direction (PSY) | Microns | PSX(O2) = PSY(O1) + TV(O2) − TV(O1) |

The transformation values for some acquisition parameters, for example, the exposure time and the focal plane offset may be specified for each a plurality of wavelengths of light. In some embodiments, the HCIS 100 may associate a range of wavelengths of light emitted or reflected by the sample into channels, wherein each channel corresponds to a portion of the light spectrum. In such embodiments, the objective lens database 108 may include transformation values for each such channel. In some embodiments, the objective lens database 108 may include transformation values associated with wavelengths (or channels) of light that are emitted and imaged in fluorescent microscopy, and additional transformation values associated with wavelengths of light that are reflected and imaged in brightfield microscopy. Other transformation values, such as the laser autofocus exposure time may not vary by the wavelength of light, and therefore the objective lens database 108 may include one transformation value that is used regardless of the wavelength of light.

In some embodiments, after the configuration module 108 has determined the second values of acquisition parameters to use with the second objective lens from the first values of the acquisition parameters used with the first objective lens, the GUI controller 106 of the HCIS 100 may display the second values of acquisition parameters for the user to review. The user may then request that the HCIS 100 capture an evaluation image of the microscopy sample using the second objective and the second values of acquisition parameters. The GUI controller 106 may display such evaluation image on the screen of the computer 112, and allow the user to adjust the second values of the acquisition parameters one or more times before final image(s) of the microscopy sample are captured.

Figure 2:
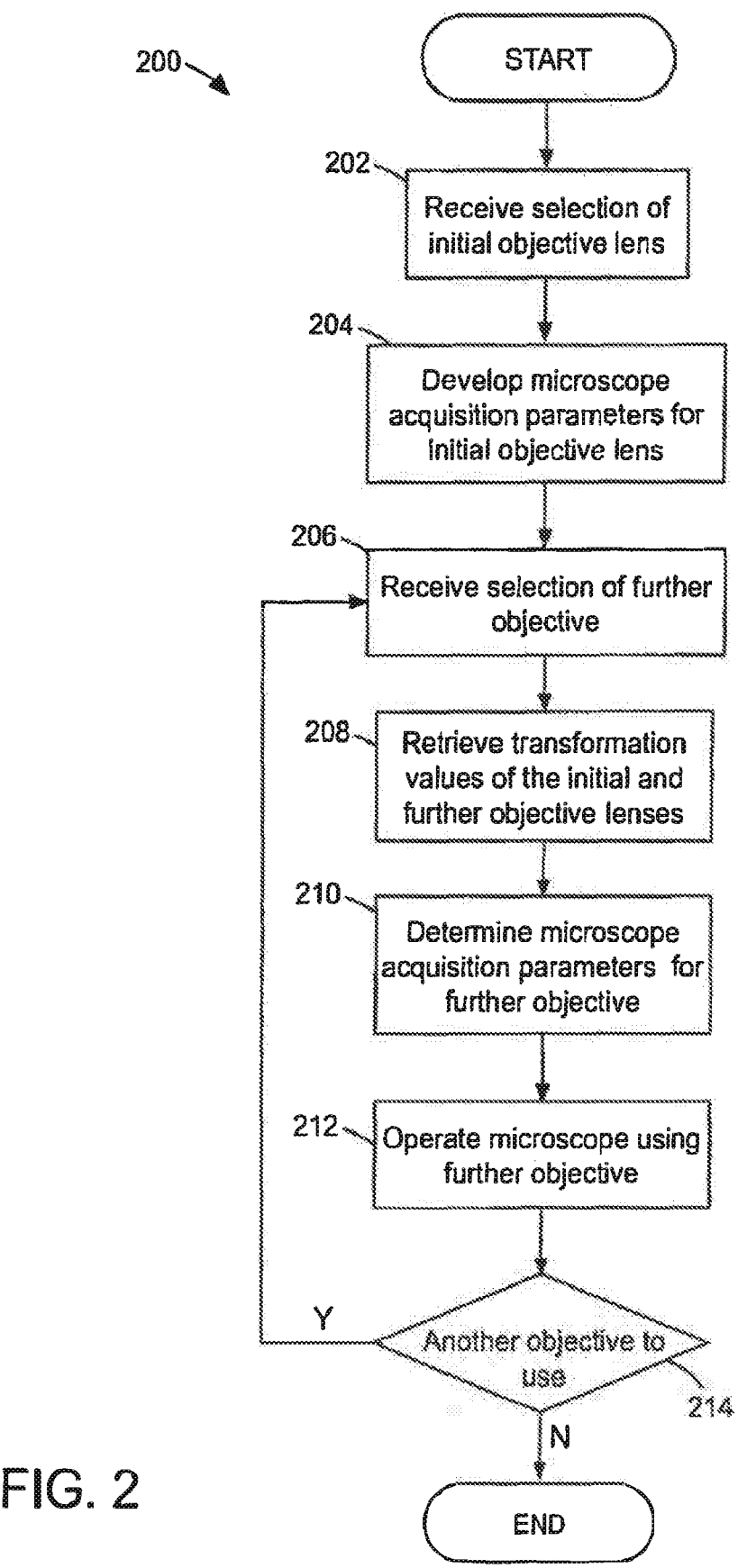
FIG. 2 is a flowchart of processing undertaken to automatically configure the high content imaging system of FIG. 1.

Referring to FIG. 2, a flowchart 200 illustrates operation of the HCIS 100 as described above. At block 202, the GUI controller 106 receives from the user a selection of an initial objective lens.

At block 204, the HCIS 100 develops the microscope acquisition parameters for the initial objective lens. In particular, the microscope controller 104 may direct the microscope 100 to capture an evaluation image. The GUI controller 106 may display the evaluation image on the screen associated with the computer 112, and receive from the user adjustments to the values of the acquisition parameters used to generate the evaluation image. In some cases, the user may direct, using the input device associated with the computer 112, the HCIS 100 to capture, and store and/or display a final image of the microscopy sample using the initial objective lens as described above.

At block 206, the GUI controller 106 receives from the user a selection of a further objective lens and provides such selection to the microscope controller 104. The microscope controller 104 directs the configuration module 108 to develop the values of the acquisition parameters to be used with the further objective lens.

At block 208, the configuration module 108 retrieves from the objective lens database 110 first and second transformation values associated with the initial and the further objective lenses, respectively, for each acquisition parameter. At block 210, the configuration module 108 uses the value of the acquisition parameters used with the initial microscope lens, and the first and second transformation values associated with such parameters to determine the values of acquisition parameters to use with the further objective lens. Such values of the acquisition parameters to use with the further objective lens are provided to the microscope controller 104, which configures the microscope 100 accordingly.

At block 212, the microscope controller 104 configures the microscope 102 to use the further objective lens selected at block 206 and the values of the acquisition parameters determined at block 210, and directs the microscope 104 to capture one or more images of the microscopy sample. The microscope controller, also at block 212, receives such captured image(s), and stores the captured images and/or displays the captured images on the screen associated with the computer 112.

In some embodiments, the GUI controller 106 may display the values of the acquisition parameters for use with the further objective determined at block 210, and/or an evaluation image captured using such values, and allow the user to modify these values before the microscope controller 104 operates the microscope 102 at block 212, as described above.

The objective lens database 110 may be populated with transformation values when the microscope 102 is fitted with objective lenses, for example, during manufacture thereof. Alternately, the objective lens database 110 may be populated with transformation values during a configuration process facilitated by the microscope controller 104.

Figure 3:
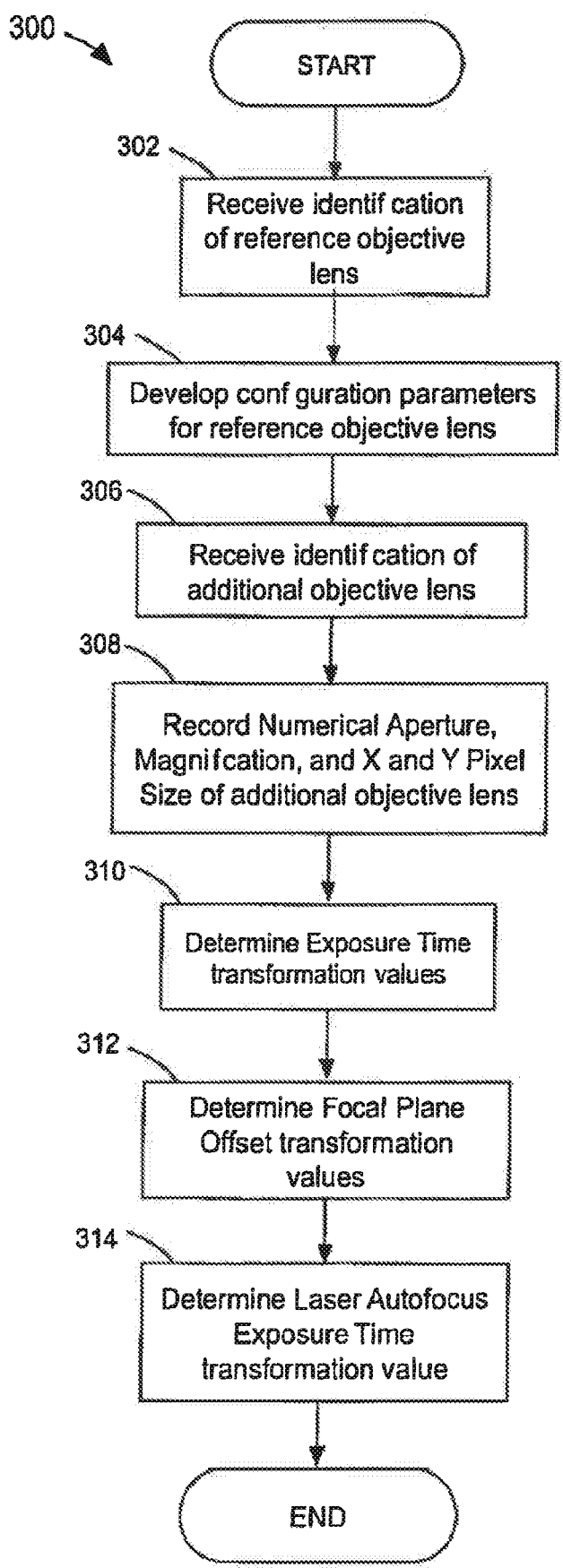
FIG. 3 is a flowchart of processing undertaken to develop an objective lens database used by the high content imaging system of FIG. 1.

Referring to FIG. 3, a flowchart 300 illustrates how the HCIS 100 may be used to develop the transformation values stored in the objective lens database 110. At block 302, one of the objective lenses of the microscope 102 is selected as a reference objective lens. The selected lens may be, for example, an objective lens that has the lowest magnification compared to the other lenses of the microscope 102.

At block 304, the HCIS 100 develops, with assistance from the user, the values of the acquisition parameters for use with reference objective lens. As described above, the evaluation image may be captured and presented to the user, the user may be allowed to adjust parameters, and a further evaluation image may be captured and presented to the user. The HCIS 100 may iterate in this manner until the user is satisfied with the evaluation image captured by the HCIS 100, and such evaluation image is considered a reference image as described below. The transformation values associated with the reference objective that have percent units are set to one hundred percent. Those transformation values associated with the reference that have units associated with a distance are set to zero.

At block 306, the user may select a target objective lens from those installed in the microscope 102 for which to develop transformation values. In some embodiments, the objective lens database 110 may be configured with manufacturer provided information for each objective lens installed in the microscope. Such manufacturer provided information may includes an identifier (e.g., a model number) of the objective lens, a numerical aperture of the objective lens, the magnification of the objective lens, and the X and Y pixel sizes associated with the objective lens. The X and Y pixel sizes are measures of the pixel size at the focal plane of the image capture device of the microscope 102. If such manufacturer provided information is not already stored in the objective lens database 110 for the target objective lens, then at block 308, the GUI controller 106 may request such information from the user. The configuration module 108 records such information in an entry associated with the target objective lens in the objective lens database 110.

At block 310, for each wavelength, the microscope controller 104 directs the microscope to capture images using the target objective lens at various the exposure times. The GUI controller 106 displays the captured images to the user, and requests from the user a selection of the image that has an image intensity closest to that of the reference image. In some embodiments, the configuration module 108 may automatically evaluate intensities of the captured images, and selects the image that has an intensity nearest to that of the reference image. For each wavelength, the configuration module 108 calculates the percent difference between the exposure time associated with the selected image and the exposure time used to capture the reference image, and stores such percent difference as the transformation value associated with the exposure time parameter and the wavelength.

At block 312, for each wavelength, the microscope controller 104 directs the microscope to capture images with various distances between the target objective lens and a focal plane where the laser is focused. Such images are displayed to the user, and the user is asked, using the GUI controller 106, to select an image that is at an optimal focal plane. That is, the user is asked to select the image that is most in focus. In some embodiments, the configuration module 108 may automatically evaluate the focus of such captured images and selects the image that has the best focus or a focus closest to that of the reference image. For each wavelength, the configuration module 108 calculates the difference in distance from the focal plane associated with the selected image and the distance from the focal plane used to capture the reference image, and stores such offset difference as the transformation value associated with the focal plane offset parameter and the wavelength.

At block 314, the microscope controller 104 directs the microscope to capture images with various laser autofocus exposure times until there is an adequate reflection from the reference sample or a surface of a plate holding the reference sample of a spot of light generated by the a laser for the laser autofocus system to determine the focal plane of such reference sample or surface. The configuration module 108 determines a percent difference between the laser autofocus exposure time that provides an adequate reflection using the target objective lens and the laser autofocus exposure time used to generate the reference image, and records such percent difference as the transformation value associated with the laser autofocus exposure time parameter associated with the target objective lens.

The steps undertaken at blocks 306 through 314 may be repeated for each objective lens available for use with the microscope 102 to develop transformation values associated with such objective lens. These transformation values may be developed once and stored in the objective lens database 110 for subsequent use. Such transformation values need not be re-developed unless the operating characteristics of the microscope 102 are changed. Such operating characteristics may include the introduction of a new component or a modification of a component of the HCIS 100 including an objective lens, light source, image capture device, and the like. Such operating characteristics may also include a modification that changes the light path between the reference sample and the image capture device.

It should be apparent to one who has skill in the art, that the same sample, e.g., a reference sample, should be loaded into the microscope 102 to develop the transformation values associated with each objective lens. Such reference sample may be selected by the user or may be provided by the manufacturer of the HCIS 100. The reference sample may be selected in accordance with test samples with which the HCIS 100 is to be used. The reference sample may have a consistent imaging response from image acquisition to another. Further, the reference sample may incorporate materials (for example, fluorescent dyes) representative of the materials that are expected to be present in the test samples with which the HCIS 100 is to be used.

It should be apparent to those who have skill in the art that any combination of hardware and/or software may be used to implement the HCIS 100 described herein. It will be understood and appreciated that one or more of the processes, sub-processes, and process steps described in connection with FIGS. 1-3 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-3. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the microscope controller 104, the GUI controller 106, and the configuration module 108 of FIG. 1), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A high content imaging system, comprising: a microscope having a first objective lens and a second objective lens;
an objective lens database having first and second transformation values associated with the first and the second objective lenses, respectively;
a microscope controller that operates the microscope with the first objective lens to develop first values of acquisition parameters; and
a configuration module that, upon confirmation that the evaluation image taken with the first objective lens is acceptable, retrieves from the database the first and second transformation values and automatically determines second values of the acquisition parameters for use with the second objective lens using a) the first values of the acquisition parameters, b) the first transformation values associated with the first objective lens, and c) the second transformation values associated with the second objective lens;
wherein the microscope controller operates the microscope using the second objective lens and the second values of the acquisition parameters to produce a final image of the microscopy sample, the final image being taken with a higher resolution than the evaluation image or being imaged over a wider portion of the microscopy sample than the evaluation image.

2. The high content imaging system of claim 1, further including an image capture device.

3. The high content imaging system of claim 2, wherein the microscope controller directs the microscope to load the second objective lens in the light path between a sample and the image capture device.

4. The image capture device of claim 1, wherein a first image of a sample captured using the first objective lens and a second image of the sample captured using the second objective lens.

5. The high content imaging system of claim 1, wherein a value of the second values of the acquisition parameters automatically determined by the configuration module is one of an exposure time, focal plane offset, laser autofocus exposure time, and pixel size to use with the second objective.

6. The high content imaging system of claim 5, wherein the value of the second values of the acquisition parameters is associated with a particular wavelength of light or a channel of the light spectrum.

7. The high content imaging system of claim 1, wherein the first transformation values include values associated with fluorescent microscopy.

8. The high content imaging system of claim 1, wherein the first transformation values include additional values associated with brightfield microscopy.

9. The high content imaging system of claim 1, wherein the configuration module permits user inspection of the evaluation image.

10. The high content imaging system of claim 9, wherein the configuration module permits user adjustment of the acquisition parameters used to obtain the evaluation image prior to obtaining the final image.

11. A method of operating a high content imaging system, wherein the high content imaging system includes a microscope, a first objective lens, a second objective lens, and an image capture device, comprising the steps of: operating the microscope with the first objective lens to develop first values of acquisition parameters and to produce an evaluation image of a microscopy sample;
upon confirmation that the evaluation image taken with the first objective lens is acceptable, retrieving from a database the first and second transformation values and automatically determining second values of the acquisition parameters for use with the second objective lens using a) the first values of the acquisition parameters, b) the first transformation values associated with the first objective lens, and c) the second transformation values associated with the second objective lens; and
operating the microscope using the second objective lens and the second values of the acquisition parameters to produce a final image of the microscopy sample, the final image being taken with a higher resolution than the evaluation image or being imaged over a wider portion of the microscopy sample than the evaluation image.

12. The method of claim 11, wherein the method further includes operating an image capture device.

13. The method of claim 12, wherein the method further includes directing the microscope to load the second objective lens in a light path between a sample and the image capture device.

14. The method of claim 12, wherein the method further includes receiving a first image of a sample captured using the first objective lens and a second image of the sample captured using the second objective lens.

15. The method of claim 11, wherein a value of the second values of the acquisition parameters is one of an exposure time, focal plane off set, laser autofocus exposure time, and pixel size to use with the second objective.

16. The method of claim 11, wherein the value of the second values of the acquisition parameter is associated with a particular wavelength of light or a channel of the light spectrum.

17. The method of claim 11, wherein the first transformation values include values associated with fluorescent microscopy.

18. The method of claim 17, wherein the first transformation values include additional values associated with brightfield microscopy.

19. The method of claim 11, further comprising receiving a user adjustment of the acquisition parameters used to obtain the evaluation image prior to obtaining the final image.

* * * * *